Figure 1:
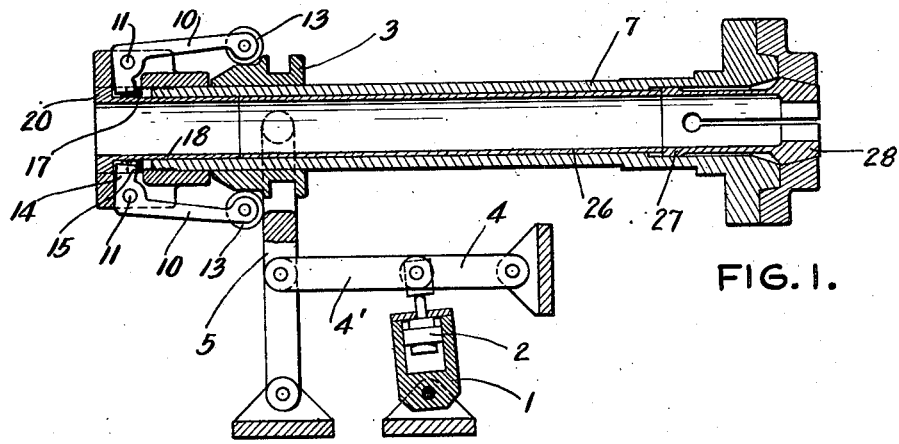

May 1, 1945.  O. KYLIN  2,375,115

COLLET CHUCK OPERATING MECHANISM

Filed March 2, 1943

INVENTOR.
OSKAR KYLIN
BY Haugood & Van Horn
Attorneys

Patented May 1, 1945

2,375,115

UNITED STATES PATENT OFFICE 2,375,115

COLLET CHUCK OPERATING MECHANISM

Oskar Kylin, Cleveland Heights, Ohio, assignor to Bardons and Oliver, Inc., Cleveland, Ohio, a corporation of Ohio Application March 2, 1943, Serial No. 477,729

2 Claims. (Cl. 279—1)

My invention is an improvement in collets and relates more particularly to an adjustable operating means therefor.

A present method of adjusting a collet so that its fingers may grip a length of bar stock fed through the collet, is to adjust the finger holder on the spindle. This method is objectionable when the wedge member is power operated because of the fact that the back and forth travel of the wedge member is definite.

The present invention aims to overcome this objection by providing an abutment sleeve for sliding the collect tube and by providing a member adjustably positioned on the abutment sleeve to more effectively utilize the bar gripping stroke of the wedge member.

Another object of the invention is to provide a simple adjustable means of the class described which is positive in operation and which affords a means for accurately controlling the power operation of the collet fingers.

Other objects and advantages of my invention will become more apparent as the following description of one embodiment thereof progresses, reference being made to the accompanying drawing in which like reference characters are employed to designate like parts throughout the same.

Figure 2:
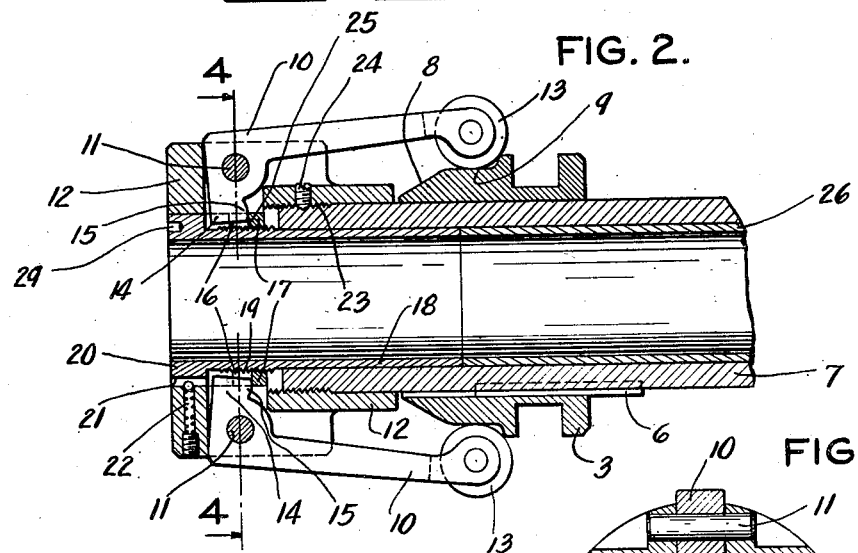
Figure 3:
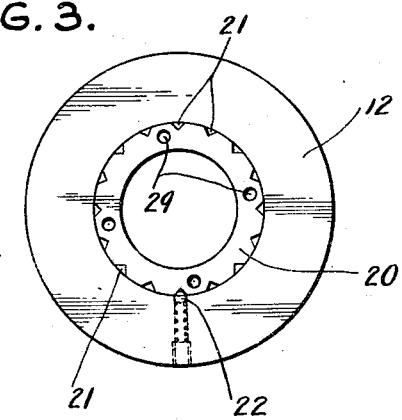
Figure 4:
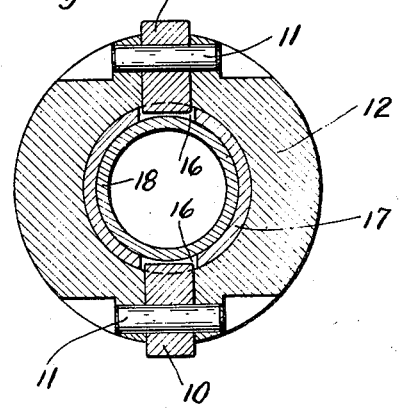

In the drawing:

Figure 1 is a longitudinal section through a spindle collet chuck of the power operated type, showing my invention applied in use, Figure 2 is a slightly enlarged view of the rear end portion of the collet showing the power operated wedge and tube operating fingers, Figure 3 is a rear end view of the device shown in Figure 2, and Figure 4 is a vertical section taken on line 4—4 of Figure 2.

In the embodiment of the invention illustrated in the drawing I have shown a power operated spindle collet for gripping bar stock fed into position for a working operation on a machine tool. The power operating means may be motivated in any suitable manner, but in the present illustration I have shown hydraulically actuated means somewhat similar to that illustrated in a copending application of Oskar Kylin, Henrik O. Kylin, and Michael Valentino, Serial No. 442,626, filed May 12, 1942. More specifically there may be provided a pivoted hydraulic cylinder 1 in which the piston 2 operates in response to the actuation suitable control valves and associated mechanism which is not duplicated here since the present invention has to do more particularly with the collet and its operation as a result of power transmitted for that purpose. But for sake of clarity it may be stated that when the piston 2 is in the position shown the wedge member 3 will be at its limit of travel to the left as shown in Figure 1, whereas with the piston in its opposite position in the cylinder, the wedge member will be moved, through the toggle linkage 4, 4' and 5 to its extreme limit of travel to the right in Figure 1.

The wedge member 3 is slidably keyed at 6 to rotate with the spindle 7 and is provided with an inwardly sloping wall 8 and a substantially horizontal or cylindrical wall or land 9. Actuating fingers 10 pivoted at 11 on the end member 12 extend forwardly and terminate in rollers 13 which are adapted to rest or ride upon the wedge surfaces 8 or 9 depending upon the position of the wedge. The fingers 10 are each provided with a depending arm or projection 14 having a rounded or curved end bearing surface 15. These projections extend into and operate within the slots 16 formed in the adjusting ring 17 threaded on to the pusher sleeve 18 as at 19.

The pusher sleeve 18 is formed at its outer end with an enlarged end portion 20 having a plurality of spaced sockets or seats 21 arranged about its periphery as seen more clearly in Figure 3, while the end member 12 is provided with a radially disposed spring pressed detent as indicated at 22. In this manner accidental relative rotational movement between the sleeve and the spindle is prevented. The end member is threaded on to the rotatable spindle tube 7 as at 23 and is locked in place by means of the locking screw 24. Thus the whole assembly including the spindle tube 7, the wedge 3, the end member 12 and its associated fingers together with the sleeve 18 will rotate as a unit during a working operation.

In a collect chuck of the type disclosed where the wedge member is power actuated it has a very definite limit of travel back and forth on the spindle tube, and in order to obtain the maximum gripping efficiency in the collet fingers it has heretofore been necessary to accurately adjust the finger holder on the spindle. With the present invention, however, the adjusting means may be embodied in the end member and may be actuated without disturbing the position of the end member on the tube 7.

The adjusting ring 17 is threaded on to the threaded rear end of the pusher tube 18 so that the slots 16 face rearwardly to accommodate the arms 14 of the fingers 10. As will be clearly seen in Figure 2 the rounded or curved surfaces 15 of the arms 14 abut the rear walls 25 of the slots in the ring 17 and as the wedge is moved toward the extreme left position which is illustrated, the rollers 13 will climb the inclined wall 8 and come to rest on the land 9 as shown. In this position the arms 14 have caused the pusher sleeve 18 to travel to the right and to push the tube 26 and the collet member 27 in that direction to effect a strong gripping action by the collet fingers 28 upon a length of bar stock extending through the collet assembly.

It will be seen therefore that if the gripping stroke of the pusher tube 18 is to be adjusted to provide a stronger gripping effort in the collet chuck, the ring abutment 17 must be adjusted slightly to the left on the sleeve and conversely if the full gripping stroke is to be shortened the abutment ring 17 may be adjusted to the right on the sleeve 18. Such adjustments are easily accomplished without disturbing the end member 12 by merely rotating the sleeve 18 in the desired direction relative to the spindle 7 by applying a wrench or other tool having pins or projections which seat in the sockets 29 formed in the end of the sleeve 18. The sleeve may then be rotated in either direction. Since the arms 14 of the finger 10 operate in the slots 16 of the abutment ring and since the sleeve is being rotated relative to the end member 12 and the tube 7, the ring 17 will be advanced or retracted on the sleeve 18. When the proper adjustment is obtained the detent 22 will enter one of the sockets 21 and thereby tend to prevent further relative rotational movement between the sleeve and the end member during the rotation of the spindle.

It will be seen that by this invention, I have provided a very simple means for effecting and maintaining an accurate gripping adjustment for a collet chuck employing a power operated wedge member for operating the chuck, and that the desired adjustment may readily be made from the rear of the collet assembly by simply rotating the pusher sleeve relative to an abutment ring and the collet end member and without adjusting the end member relative to the spindle tube 7.

Various changes may be made in the details of construction of my invention without departing from the spirit of the same or the scope of the following claims.

I claim:

1. The combination with a rotary hollow spindle and a chuck or collet carried by the spindle, of a pusher tube slidable in the spindle, a body rotatable with the spindle, fingers pivotally carried on the body, means slidable on the spindle for operating said fingers radially of the body, a member insertible into an end of the spindle and having a portion abutting an end of said pusher tube, and an abutment adjustably carried by said member and engageable with portions of said levers to transmit a thrust to the pusher tube when said fingers are moved radially in one direction and means for removably locking said member against relative rotational movement with respect to the spindle, but permitting relative sliding movement therebetween said means including relatively movable cooperating members carried by said insertible member and by said body.

2. The combination with a rotary hollow spindle and a chuck or collet carried by the spindle, of a pusher tube slidable in the spindle, a body rotatable with the spindle, fingers pivotally carried on the body, means slidable on the spindle for operating said fingers radially of the body, a member insertible into an end of the spindle and having a portion abutting an end of said pusher tube, and an abutment adjustably carried by said member and engageable with portions of said levers to transmit a thrust to the pusher tube when said fingers are moved radially in one direction, said member having a threaded portion for receiving said abutment in a selected axial adjustment thereon, said abutment member having a plurality of openings for receiving the portions of the levers engageable with said abutment, and means for releasably engaging the body with said member to prevent accidental relative rotation but permitting relative sliding movement therebetween.

OSKAR KYLIN.